United States Patent
Maciel Thom et al.

[11] Patent Number: 5,913,495
[45] Date of Patent: Jun. 22, 1999

[54] AUXILIARY SUPPORT FOR VIBRATION DATA COLLECTION SENSOR

[75] Inventors: Fabio Cesar Maciel Thom, Serra; João Bosco Sales Pinheiro, Vitória; Acy Carvalho Almeida, Cariacica; Carlos Alberto Cavalcanti Ignácio; Miguel Angelo Salles Teles, both of Vitória; João Joaquim Da Silva; Cosme Pereira, both of Serra, all of Brazil

[73] Assignee: Companhia Vale Do Rio Doce, Minas Gerais, Brazil

[21] Appl. No.: 08/940,317

[22] Filed: Sep. 30, 1997

[30] Foreign Application Priority Data

Feb. 25, 1997 [BR] Brazil ........................ 9701639

[51] Int. Cl.⁶ ................................. F16L 3/00
[52] U.S. Cl. ................ 248/52; 81/177.2; 248/542
[58] Field of Search ............... 248/51, 52, 542; 81/177.2

[56] References Cited

U.S. PATENT DOCUMENTS

| | | | |
|---|---|---|---|
| 1,161,270 | 11/1915 | Vance | 81/489 |
| 4,725,027 | 2/1988 | Bekanich | 248/542 |
| 4,729,281 | 3/1988 | Holloway, Jr. | 81/177.2 |
| 4,827,771 | 5/1989 | Cary et al. | 73/644 |
| 5,279,189 | 1/1994 | Marino | 81/177.2 |
| 5,361,867 | 11/1994 | Olson et al. | 248/542 |
| 5,471,899 | 12/1995 | Twomlow | 81/177.2 |
| 5,680,800 | 10/1997 | Sharpe | 81/177.2 |

*Primary Examiner*—Ramon O. Ramirez
*Assistant Examiner*—Robert Lipcsik
*Attorney, Agent, or Firm*—Helfgott & Karas, P.C.

[57] ABSTRACT

The auxiliary support concerns an auxiliary support for vibration data collector sensor comprising a telescopic rod 1, on which forward end is attached fork 4 made from an U-shaped bent flat rod which open ends are to be fitted with part (5) provided with the center opening (5c) in which is fitted and fastened the vibration sensor (8).

3 Claims, 2 Drawing Sheets

AUXILIARY SUPPORT FOR VIBRATION DATA COLLECTION SENSOR

FIELD OF INVENTION

The present invention concerns an auxiliary support for vibration data collection sensor.

More specifically, the present invention concerns an auxiliary support for vibration data collection sensor useful to detect vibrations on rotary devices.

BACKGROUND OF INVENTION

As it is known by the skilled in the art, in order to collect data on rotary devices, that is, to detect the existence of any possible vibrations in the devices, sensors are employed which are coupled to a reading and recording device. The sensors must be placed closely the local to be measured in order to be able to effectively collect data. The term "local" means a specific part of the device.

Generally, the approach between the sensor and the local to be measured is done manually by an operator who is holding the sensor in one of his hands and placing it as close as possible to the local on the rotating device where the collect the data is desirable.

Nevertheless, this procedure besides representing a significant accident risk to the operator it does not allow for an efficient collection of data on difficult places to be reached.

SUMMARY OF INVENTION

In order to find a solution for this problem, the present auxiliary support for vibration data collection sensor has been developed. The support basically consists of an extendible and adjustable rod having an U-shaped fork or any other appropriate shape on its extremity and having between the free ends of the lateral branches an articulated base provided with a center opening into which can be fixed the sensor responsible for the data collection.

To measure the vibrations with the auxiliary support of the invention, the operator fits and attaches the sensor to the forward base of the support and by holding the posterior end of the telescopic rod he places the sensor close to the desired local.

The present auxiliary support besides avoiding that the operator is exposed to any risks or accidents by permanently keeping his hands away from the local to be measured in the device, it also enables that the data collection can be performed anywhere even in the most inaccessible parts or places because said support allows for measurements at different distances and positions due to its adjustable rod and the articulation of the base holding the sensor.

In addition, said support shows light weight, low cost, easy to handle, disassemble and carry. Also, maintenance is not required.

BRIEF DESCRIPTION OF THE DRAWINGS

The present invention shall be described in reference to the attached drawings which are simply given as an example without any limiting characteristics.

The FIG. 1 represents a perspective view of the support.

Figure 1:
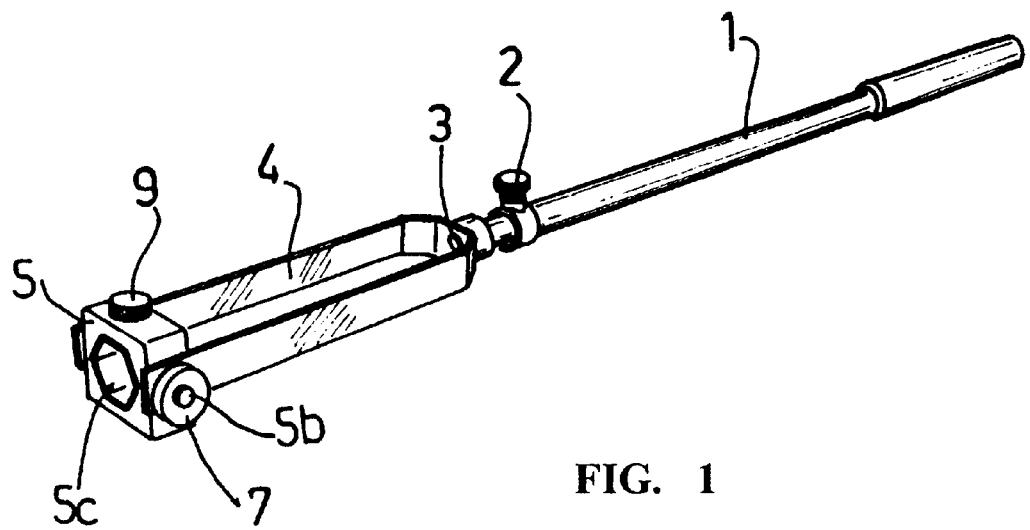
Figure 2:
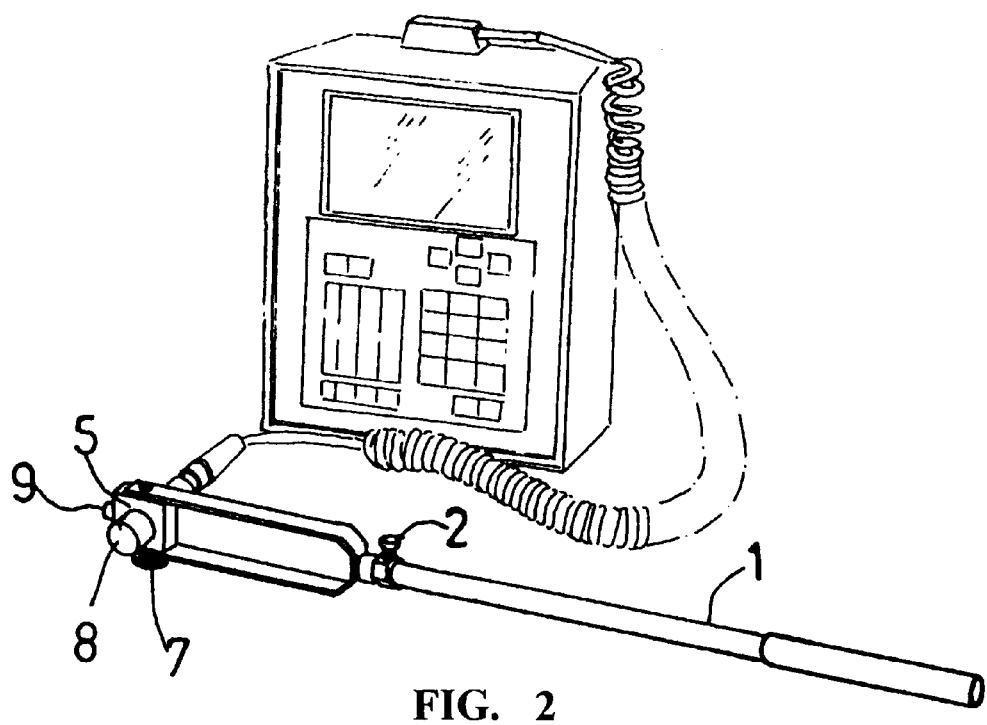

The FIG. 2 represents the perspective view of the support with the sensor attached to it.

Figure 3:
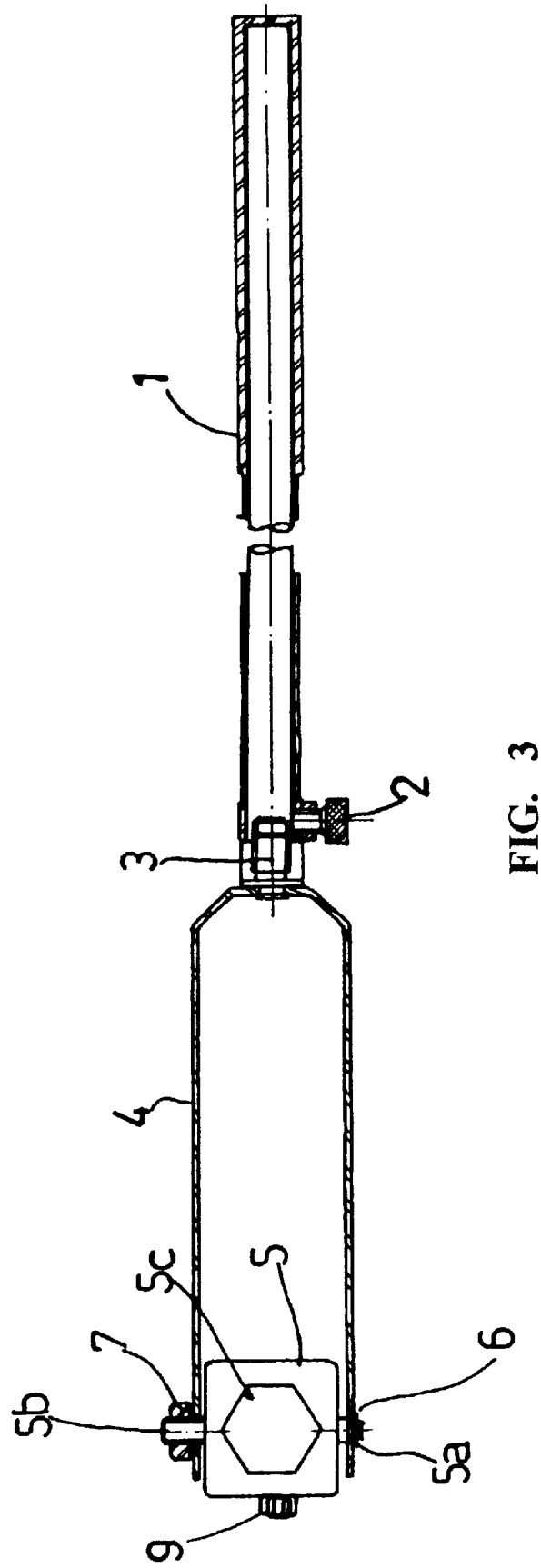

The FIG. 3 represents a longitudinal cross section of the support.

DETAILS OF THE INVENTION

In accordance with the above-cited figures, the auxiliary support for vibration data collection of the present invention comprises a telescopic rod 1 provided with and adjustment screw 2 placed near the forward end which has an inside thread into which is threaded the attachment part 3 of the forward fork 4. The fork 4 consists of an U-bent laminated stem or of any other suitable shape.

Between the open ends of the fork 4 is provided a parallelepiped shaped part 5 from which side and opposite faces project a short pin 5a and a long pin 5b which delimits a middle axis of articulation; pins 5a and 5b fit the corresponding orifices on the open ends of the sides of fork 4 to be fasten with the retaining washer 6 and nut 7, respectively, which allows for the adjustment of the positioning of the referred part 5 through the rotation of the same in relation to the axis limited by them. In addition, said part 5 is provided with the center opening 5c which fits the vibration sensor 8 attached thereon by screw 9 running through the orifice on one of the open ends of part 5.

Although a preferred configuration 5 has been described and illustrated for the auxiliary support for vibration data collection sensor, it is important to point out that some structural changes can be introduced without deviating from the scope of the present invention.

What is claimed:

1. An auxiliary support for a vibration data collection sensor comprising a telescopic rod provided with an adjustable screw located near a forward end of said telescopic rod, said adjustable screw having an inside thread, a forward fork shaped in a U-bent flat rod being fastened to said inside thread of said adjustable screw, said forward fork including open ends fitted with a parallelepipedic part projecting from opposite ends a plurality of pins, including a first pin and a second pin, said first pin being longer than said second pin, said first and second pins being fitted into corresponding passages on sides of the open ends of the fork, said parallelepipedic part being also provided with a central aperture for receiving the vibration sensor in a cooperating fit, a screw threaded through one side of said parallelepipedic part for fastening the vibration sensor into said aperture.

2. The auxiliary support for vibration data collection sensor of claim 1, wherein said first and second pins are joined together by fastening means.

3. The auxiliary support for vibration data collection sensor of claim 2, wherein said fastening means is a nut and a bolt including a washer therebetween.

* * * * *